United States Patent
Qi et al.

(10) Patent No.: US 7,430,358 B2
(45) Date of Patent: Sep. 30, 2008

(54) ELLIPTICAL DIFFUSERS USED IN DISPLAYS

(75) Inventors: Jun Qi, Corona, CA (US); Joel Mikael Petersen, Valley Village, CA (US); Christopher Chapman Rich, Rancho Palos Verdes, CA (US)

(73) Assignee: Wavefront Technology, Inc., Paramount, CA (US)

( * ) Notice: Subject to any disclaimer, the term of this patent is extended or adjusted under 35 U.S.C. 154(b) by 0 days.

(21) Appl. No.: 11/406,792

(22) Filed: Apr. 19, 2006

(65) Prior Publication Data

US 2006/0239629 A1 Oct. 26, 2006

Related U.S. Application Data

(60) Provisional application No. 60/672,946, filed on Apr. 20, 2005.

(51) Int. Cl.
*G02B 6/10* (2006.01)
*G02B 6/00* (2006.01)

(52) U.S. Cl. .................. 385/146; 385/147; 362/26; 362/610; 349/64; 349/65

(58) Field of Classification Search ............ 385/129, 385/131, 133, 146, 147
See application file for complete search history.

(56) References Cited

U.S. PATENT DOCUMENTS

| 5,592,332 | A | | 1/1997 | Nishio et al. | |
|---|---|---|---|---|---|
| 5,600,462 | A | * | 2/1997 | Suzuki et al. | 349/112 |
| 5,999,281 | A | * | 12/1999 | Abbott et al. | 359/15 |
| 6,151,166 | A | * | 11/2000 | Matsushita et al. | 359/566 |
| 6,364,497 | B1 | | 4/2002 | Park et al. | |
| 2004/0027676 | A1 | * | 2/2004 | Nilsen et al. | 359/619 |
| 2005/0063063 | A1 | * | 3/2005 | Ashdown | 359/599 |

FOREIGN PATENT DOCUMENTS

WO   WO 2006/118784   11/2006

OTHER PUBLICATIONS

ISR for PCT/US2006/014615 filed Apr. 19, 2006 (Publication No. WO 2006/118784).

* cited by examiner

*Primary Examiner*—M. R. Connelly-Cushwa
*Assistant Examiner*—Rhonda S Peace
(74) *Attorney, Agent, or Firm*—Knobbe, Martens, Olson & Bear, LLP (57) ABSTRACT

A backlit light display comprises a light guide panel, a prismatic film, an asymmetric top diffuser and an LCD. A linear light source is disposed along a side face of the light guide panel. Light from the linear light source is transmitted though the light guide panel where it is spread and uniformly output through a front face to the prismatic film. Light incident on the prismatic film is redirected more along a first direction than along a second direction. This light is directed more normal to the LCD. An asymmetric diffuser is applied between the prismatic film and the LCD panel to smear the periodic information from the prismatic film and eliminate the Moiré fringe pattern resulting from interference between the periodic structure of the prismatic film and the periodic arrangement of pixels in the LCD. The asymmetric diffuser is aligned with respect to the prismatic film such that it scatters and spreads light more in a second direction than the first direction.

37 Claims, 5 Drawing Sheets

ELLIPTICAL DIFFUSERS USED IN DISPLAYS

PRIORITY APPLICATION

This application claims the benefit of U.S. Provisional Patent Application No. 60/672,946, filed Apr. 20, 2005, the entire contents of which are hereby incorporated by reference herein.

BACKGROUND

1. Field of the Invention

The present invention relates generally to backlit displays, such as liquid crystal displays (LCD) displays, and particularly to configurations of backlight displays using an asymmetric diffuser, such as an elliptical diffuser.

2. Description of the Related Art

For current flat panel displays such as LCD, edge-lit backlight panels are widely used to provide illumination. Such configurations reduce the thickness of the displays. An example backlight panel may comprise a plate made of optically transmissive material. A linear light source such as a fluorescent tube or a linear array of light emitting diodes (LED) may be disposed at an edge of the backlight panel to inject light into the panel. This light is guided within the backlight panel, which may also be referred to herein as a light guide panel. Extractor features on a rear or front surface of the light guide panel may be used to disrupt the propagation of the light within the light guide panel and cause the light to be ejected from the front surface of the panel toward the LCD.

One or more optical films or sheets of material such as brightness enhancement films (BEFs) may be used to control the angular distribution of light extracted from the light guide panel to the LCD. BEFs, for example, comprise a periodic array of prismatic structures disposed on the surfaces thereof that redirect or collimate the light from the light guide panel along a viewing axis of an LCD (i.e., an axis typically normal to the display). The BEFs bend light toward a more normal angle via direct refraction of incident light. The BEFs may also recycle light outside a desired range of angles. Such light is total internally reflected backward instead of proceeding toward the LCD. This backward reflected light is reflected again toward the BEF at a different angle. This process, referred to as recycling, may be repeated until the light passes through the BEF to the LCD within a desired range of angles. Typically, two orthogonal brightness enhancement films are applied such that the range of distribution of the output light on vertical and horizontal directions is nearly symmetrical.

The superimposition of the periodic structure of the brightness enhancement film and the pixel structure of the LCD may create observable interference fringes, known as a Moiré pattern. This Moiré pattern destroys the uniformity of the backlighting and degrades the display quality. To reduce and/or eliminate the Moiré effect, a diffuser may be disposed between the brightness enhancement film(s) and the LCD to smear periodicity in the light distribution output from the brightness enhancement film(s). In order to eliminate the Moiré effect, the haze value of the diffuser is generally relatively high.

Although such configurations provide satisfactory performance, other designs, which may yield performance enhancements, simplify manufacturing, and/or reduce cost, may be desirable.

SUMMARY

In accordance with one embodiment of the present invention a display apparatus comprises a light guide, a plurality of anamorphic optical elements, a spatial light modulator, and an asymmetric diffuser. The light guide comprises a substantially optically transmissive material that can propagate light therein. The light guide plate further comprises an output face for output of said light. The plurality of anamorphic optical elements are disposed forward of the front output face such that light from the output face is incident on the anamorphic optical elements. The output light from the output face of the light guide plate has an angular distribution. The anamorphic optical elements are configured to redirect the angular distribution of the output light along a first direction, y, more than in a second direction, x. The spatial light modulator is disposed forward said plurality of anamorphic optical elements and configured to receive the light from the output face of the light guide. The asymmetric diffuser disposed between said anamorphic optical elements and said spatial light modulator and configured to spread light incident thereon more along said second direction, x, than said first direction, y.

In accordance with another embodiment of the present invention a display apparatus comprises a means for guiding light having an output with an angular distribution, a means for redirecting light from said light guiding means, a means for selectively modulating said redirected light and a means for diffusing said redirected light prior to being selectively modulated. The redirecting means redirects said angular distribution more along a first direction, y, than in a second direction, x. The selectively modulating means is configured to form a plurality of different spatial patterns as said light passes through a plurality of regions. The diffusing means is configured to spread light incident thereon more along said second direction, x, than said first direction, y In accordance with another embodiment of the present invention, a method of displaying an image is provided. The method comprises outputting light having an angular distribution from a planar surface, redirecting the light output from said planar surface, selectively modulating said light, and diffusing said light prior to modulating said light. The light is redirected such that the angular distribution is directed more along a first direction, y, more than in a second direction, x. The light is further diffused more along said second direction, x, than said first direction, y. The light is then modulated such that as the light passes through a plurality of pixels, a plurality of different spatial patterns are formed.

In accordance with another embodiment of the present invention a display apparatus comprises a light guide, a plurality of anamorphic optical elements, a spatial light modulator, and an asymmetric diffuser disposed between said anamorphic optical elements and said spatial light modulator. The light guide comprises a substantially optically transmissive material that can propagate light therein. The light guide further comprises an output face for output of said light. The plurality of anamorphic optical elements are disposed forward of said front output face such that light from the output face of the light guide is incident on the anamorphic optical elements. The spatial light modulator is disposed forward said plurality of anamorphic optical elements to receive the light from the output face of the light guide.

In accordance with another embodiment of the present invention a display apparatus comprises a light guide, a reverse prismatic layer disposed forward of said light guide, a spatial light modulator forward said reverse prismatic layer, and an elliptical diffuser disposed between said reverse prismatic layer and said spatial light modulator.

In accordance with another embodiment of the present invention a display apparatus comprises a light guide, a plurality of anamorphic optical elements, a spatial light modulator, and an asymmetric diffuser. The light guide comprises a substantially optically transmissive material that can propagate light therein. The light guide further comprises an output face for egress of said light. The plurality of anamorphic optical elements are disposed forward of said front output face such that light from said light guide is incident on said anamorphic optical elements. The anamorphic optical elements redirect said light along a first direction, y, more than in a second direction, x. The spatial light modulator is disposed forward of the plurality of anamorphic optical elements to receive said light concentrated more along said first direction, y, than said second direction, x. The asymmetric diffuser is disposed between the plurality of anamorphic optical elements and the spatial light modulator. The asymmetric diffuser is configured to spread light incident thereon more along said second direction, x, than said first direction, y.

Certain embodiments are summarized above. However, despite the foregoing discussion of certain embodiments, only the appended claims (and not the present summary) are intended to define the invention(s). The summarized embodiments, and other embodiments, will become readily apparent to those skilled in the art from the following detailed description of the preferred embodiments having reference to the attached figures, the invention(s) not being limited to any particular embodiment(s) disclosed.

DETAILED DESCRIPTION OF CERTAIN PREFERRED EMBODIMENTS

Figure 1:
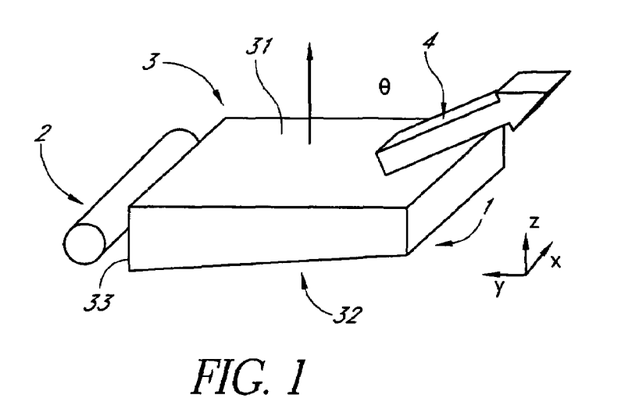
FIG. 1 depicts a backlight unit for use in a flat panel display comprising a linear light source and a backlight panel.

As described above, current flat panel displays include an edge-lit backlight to reduce the thickness of the displays. FIG. 1 shows an example edge-lit backlight unit 1, comprising a linear light source 2 and a light guide panel or plate 3 (LGP). This linear light source may comprise, for example, a cold cathode fluorescent tube (CCFL) lamp, an array (e.g., 2×2 array) of LED, an elongated tube LED, a fluorescent tube or any other suitable linear light source. This light source 2 is aligned parallel with an edge of the light guide plate 3 such that light from the linear light source 2 is incident on a side face 33 of the light guide plate 3. Although a linear light source is shown, in some embodiments, the light source is not linear.

The light guide panel 3 may comprise a substantially optically transmissive material capable of propagating light from the light source 2. The light guide panel 3 may comprise a plate having sides, each with a respective face, as well as a front, emission face and a back face. Light incident on the side face 33 propagates throughout the light guide panel 3 and exits the emission face 31. In certain embodiments, the plate 3 comprises a plane parallel plate with the emission and back faces being parallel to each other. Alternatively, the light guide panel 3 may comprise a wedge wherein the emission face and back face are angled with respect to one another.

In the example shown in FIG. 1, the light guide plate 3 includes a planar back face 32 and a planar emission face 31 angled with respect to each other such that the light guide plate 3 forms a wedge. In this example, the side, incidence face 33 and the emission face 31 are perpendicular; however other shapes and configurations are possible. Reflective or refractive elements referred to as extractors are disposed on the back face 32. Extractors may comprise white dots formed by white dot printing or V-grooves formed by V-groove cutting, molding, embossing or other technology. Other types of extractors and other methods of forming the extractors may be used. As described above, the extractors may be disposed on the front face 31 as well.

Light from the light source 2 injected through the incidence face 33 into the light guide plate 3 propagates between the front and back faces reflecting at high grazing incidence therefrom. The grazing angle approaches the critical angle such that reflection is significant. Multiple reflections enhance mixing of light within the light guide plate 3 which assists in providing uniformity in light output across the emission face.

In the example shown, light incident on the front face at high grazing angles, e.g., at or more grazing than the critical angle, reflect from the front surface 31 and continues to propagate along the light guide plate 3. Light just slightly more normal than the critical angle escapes through the front face 31. The light 4 is therefore emitted from the front face 31 of the light guide plate 3 at relatively high incident angle.

Figure 2:
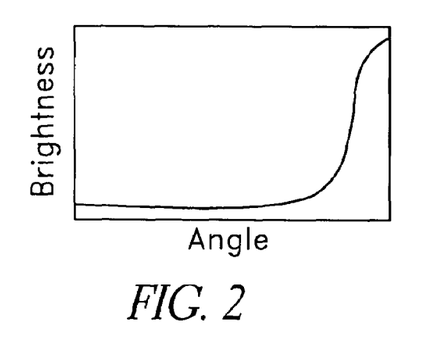
FIG. 2 depicts the angle dependent output of an edge-lit backlight unit.

An example distribution of the light 4 emitted from the light guide plate 3, showing the dependence of brightness on angle, θ, is presented in FIG. 2. As shown in FIG. 1 the angle, θ, is defined as the angle within the y-z plane as measured with respect to the normal to the light guide plate 3. In this example, most of the light 4 output from the light guide plate 3 is directed at an angle, θ, of greater than about 60°.

Figure 3:
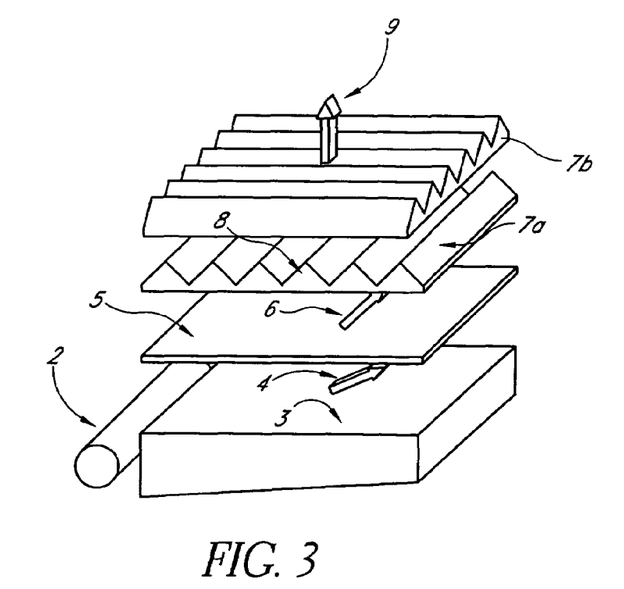
FIG. 3 depicts the backlight unit with brightness enhancement films (BEFs) and a diffuser between the BEFs and the backlight panel.
Figure 4:
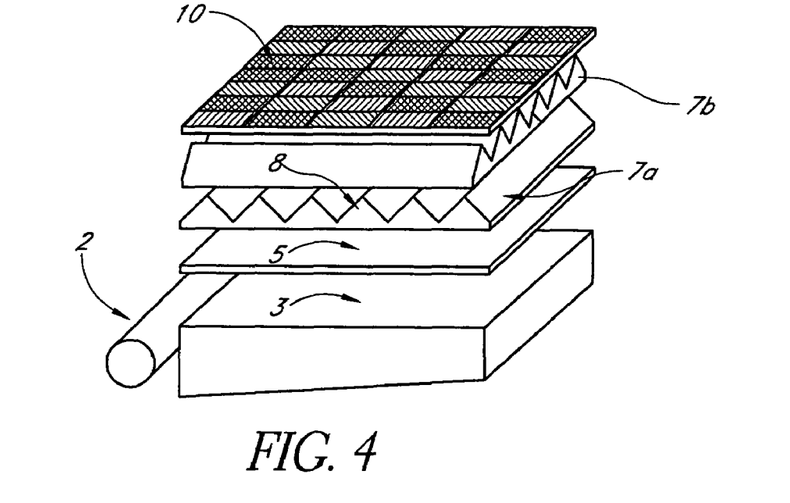
FIG. 4 depicts a backlit display comprising a light guide panel, a high haze diffuser, orthogonal brightness enhancement films, and a spatial light modulator, such as an LCD array.

Various approaches may be used to direct the light 4 exiting the light guide plate 3 at a high angle along an acceptable viewing axis, e.g., more parallel to the z axis in a direction that is substantially normal to the display. An example approach is depicted in FIGS. 3 and 4, which show a backlighting assembly that includes a high haze diffuser 5 and two orthogonal prismatic BEFs 7a-b forward of the light guide plate. FIG. 4 additionally shows a spatial light modulator 10 such as an LCD forward of the BEFs 7a-b. The high haze diffuser 5 and two orthogonal prismatic BEFs 7a-b redirect and collimate the light 4 emitted from the emission face 31 of the light guide plate 3 at a high angle of incidence toward an angle of incidence more parallel to surface normal of the assembly. The light 4 from the light guide plate 3 is emitted at a high incidence angle that does not match the input angle requirements for proper operation of the BEFs 7a-b. Accordingly, a high haze diffuser 5 is positioned between the light guide plate 3 and the BEFs 7a-b. The high haze diffuser 5 redirects the light more normal to the BEFs 7a-b and the spatial light modulator 10. This redirected light distribution is represented by arrow 6. As shown, this light 6 has a relatively small incidence angle, typically 30°-40°, which satisfies the input conditions for proper operation of the BEFs 7a-b so that the BEFs can further redirect the light even more normal to the spatial light modulator.

The brightness enhancement films 7a-b comprise, on a first side thereof, a planar surface, and on a second, opposing side thereof, a prismatic surface 8 comprising a plurality of elongated microprisms 81 having an apex angle of approximately but not limited to 90°. Here, the BEFs 7a-b are oriented such that the prismatic surface 8 faces and is closer to the diffuser 5 than the planar surface on opposite side that does not include the elongated microprisms 81. Light 6 from the high haze diffuser 5 is first incident on the planar surface of the BEFs 7a-b. The BEFs 7a-b are further oriented such that the lengthwise direction of elongated microprisms 81 on the first BEF 7a is positioned at an 90° angle with respect to the lengthwise direction of elongated microprisms 81 on the second BEF 7b. As the light 6 propagates through the BEFs 7a-b, the microprisms 81 refract the light 6 about an axis parallel to the longitudinal axis (parallel to the x and y axes respectively) of the elongated microprisms 81 such that the light is more normal to the BEFs 7a-b. Additionally, each of the BEFs 7a-b recycles light that is not within a specific range of angles. This light is reflected by the BEF backwards where the light is reflected again toward the BEF at a different after passing through the diffuser. If the new angle is sufficiently normal, this light will pass through the BEF. In this manner, recycling redirects the angular distribution of the light transmitted through the BEFs 7a-b, represented by arrow 9, into a more limited range of angles that is more normal to the display. The result is that the redirected light 9 has a high brightness at the normal or on-axis direction (e.g., parallel to the z-axis).

The orthogonal or crossed configuration of the prismatic structures 8 of the BEFs 7a-b results in the width of the light distribution on the horizontal, x, and vertical, y, axes being nearly symmetrical. In certain applications, a symmetrical field-of-view is not needed. For televisions and computer monitors, for example, although having a wide horizontal field-of-view may be desired, a similarly large vertical field-of-view may waste optical energy as light is directed to the ceiling or the floor and not to a viewer.

Figure 5:
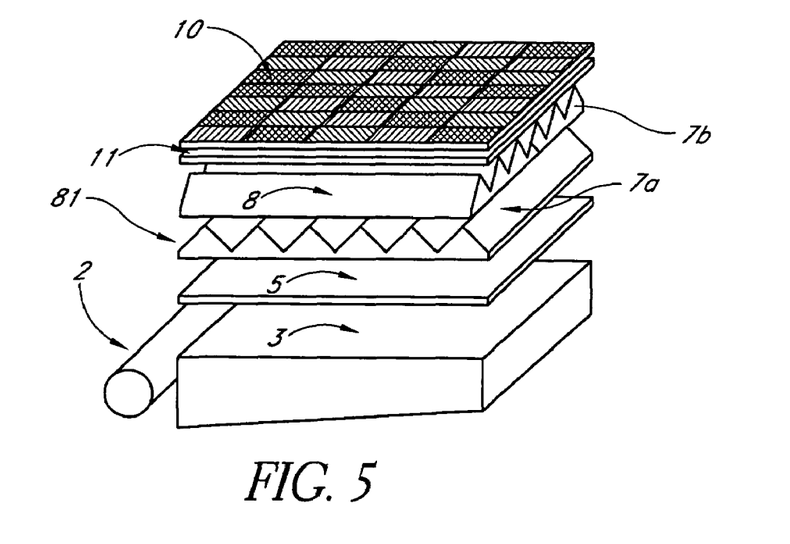
FIG. 5 depicts a configuration of backlight display comprising a light guide panel, orthogonal brightness enhancement films, a pair of high haze diffusers surrounding said BEFs, and an LCD panel.

In addition, as shown in FIG. 4, both the brightness enhancement film 7b and the LCD panel 10 are periodic structures comprising a plurality of periodic features, e.g., elongated microprisms and pixels, respectively. The periodic structure of the brightness enhancement film 7b and the pixel structure of LCD panel 10 interfere and produce a Moiré fringe pattern. The Moiré effect appears at the LCD 10 when the BEF 7b contacts the LCD panel 10 or when the LCD is otherwise disposed in front of the BEF 7b. This Moiré pattern generally comprises a series of observable fringes, which destroy the uniformity of the backlighting and deteriorate the quality of the display. In order to eliminate the Moiré effect, a top diffuser 11 is disposed between the BEFs 7a, 7b, and in particular the top BEF 7b, and the LCD panel 10 as shown in FIG. 5. The diffusing effect from the top diffuser 11 can smear the periodic illumination from the brightness enhancement film 7b. However, in order to substantially reduce or eliminate the Moiré effect, the haze value of the top diffuser 11 should be relatively high and the top diffuser 11 should output light with an angular distribution with a suitable full width at half maximum (FWHM) value. Use of a top diffuser having a circularly symmetric angular distribution directs light equally in both the vertical (e.g., x) and horizontal (e.g., y) directions. As described above, however, televisions, computer screens etc. do not need a wide field-of-view in the vertical direction in comparison with the horizontal direction. Thus, some of the light directed in the vertical direction will not be directed toward a viewer and thus will be wasted. Accordingly, excessive spread of the illumination in the vertical, together with the high haze value of the top diffuser can effectively reduce the on-axis brightness of the display in comparison with alternative embodiments described below.

Figure 6:
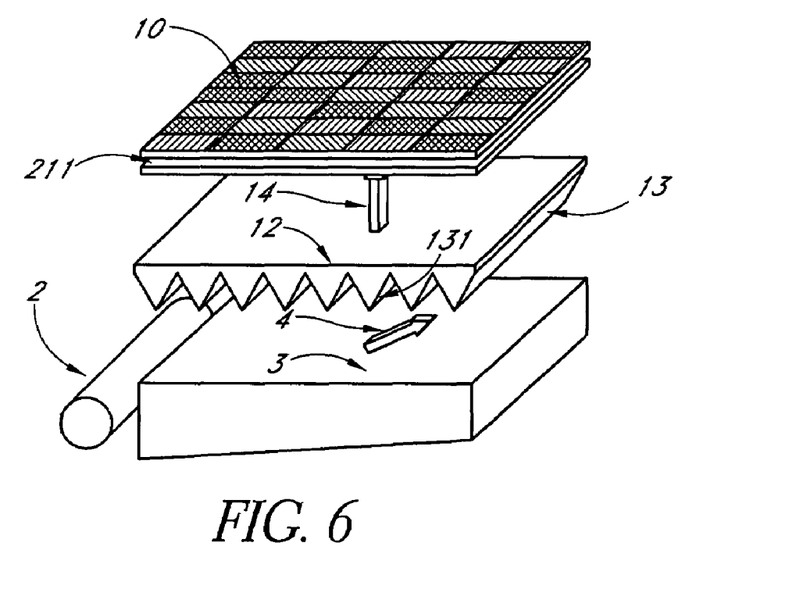
FIG. 6 depicts a backlight unit comprising a light guide panel, a single reversed prismatic film, a diffuser, and a spatial light modulator.

As depicted in FIG. 6, another possible architecture of the backlight light assembly, uses a single reversed prismatic sheet 12 to redirect the light from the light guide plate 3 more normal to the spatial light modulator 10. The reversed prismatic sheet comprises, on a first side thereof, a planar surface and on a second, opposing side thereof, a prismatic surface 13 comprising a plurality of microprisms 131. As shown in FIG. 6, these microprisms comprise a plurality of elongated microprisms 131 each having a pair of inclined surfaces that come together at an apex. The inclined surfaces have an apex angle of between about 50°-75°. The inclined surfaces form facets of the elongated microprisms 131. The inclined surfaces are oriented such that the light 4 from the emission face 31 of light guide panel 3 that is the incident on the prismatic surface 13 of the reversed prismatic sheet 12 is redirected more normal to the light guide panel and is output from the planar surface of the reversed prismatic sheet 12. In certain embodiments, this light 4 with high incident angle is redirected by prisms 131 through total internal reflection from the facets thereof to achieve an output light 14 with a maximum intensity at normal or near normal.

The prismatic sheet 12 is anamorphic and directs light in one direction more than in another direction. For example, the prismatic sheet directs light more in a direction parallel to the y-z plane than the orthogonal x-z plane. Since only one prismatic sheet 12 is used, the light 4 is redirected such that the angular distribution of light from the front face 31 of the light guide 3 is redirected in one direction more than another. The angular distribution is bent more in a direction perpendicular to the longitudinal axes of the elongated microprisms 131 than in a direction parallel to the length of the elongated microprisms 131. In the example shown in FIG. 6, the angular distribution is changed more along a direction parallel to the y-z plane via total internal reflection by the facets of the microprisms 131 than along a direction parallel to the x-z plane. The orientation of the microprisms 131 can be parallel to the horizontal, the vertical, or other directions as well. As shown, in certain preferred embodiment, only a single prismatic sheet 12 is used. Similarly, in certain embodiments, only elongated microprisms 131 oriented along one direction are used in between the light guide 3 and the spatial light modulator 10.

In certain preferred embodiments, the reversed prismatic sheet 12 is oriented with the longitudinal axes of the microprisms 131 aligned with the horizontal, x, axis, such that the light 4 and angular distribution from the light guide 3 are redirected more along a direction parallel to the y axis than the x axis. Since the light 4 emitted from the light guide plate 3 has an angular distribution that is already quite narrow, an additional prismatic layer (such as a BEF having microprisms facing the spatial light modulator) that is oriented such that the longitudinal axis of the elongated microprisms are parallel to the vertical, y, axis, is not necessary. Additionally, since the light is only redirected by the microprisms 131 through total internal reflection and not recycled like with the BEFs 7a-b having microprisms that face the spatial light modulator, the reversed prismatic sheet 12 does not substantially broaden the angular distribution of the output light 14. Furthermore, unlike with the previously described configuration using BEFs 7a-b with microprisms facing the spatial light modulator, a high haze diffuser 5 is not required to initially bend the light 4 more normal to the BEF (such as light 6 shown in FIGS. 3-5). Since this reverse prismatic sheet 12 redirects the light normal to the viewer without substantial broadening the angular distribution and no additional BEF or high haze diffuser is applied which would also increase angular broadening, this configuration reduces angular broadening and recycling loss and can thus offer more than 30% greater on-axis brightness than certain embodiments described above.

Figure 7:
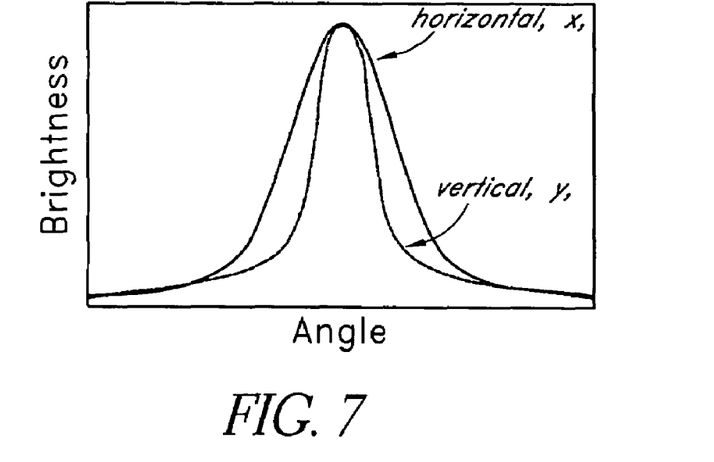
FIG. 7 depicts a plot of the angular distribution of light from a reversed prismatic film along the horizontal, x, and vertical, y, axes.

FIG. 7 shows an angular distribution of the light 14 in the horizontal, x, and vertical, y, directions after being transmitted through the reversed prismatic sheet 12 shown in FIG. 6. The full width at half maximum (FWHM) of the angular distribution of the light 14 in horizontal, x, and vertical, y, directions are approximately but not limited to 60° and 30°, respectively. As illustrated, the reversed prismatic sheet 12 redirects the angular distribution of the light more in one direction (parallel to the y axis) than in another direction (parallel to the x axis). This narrow FWHM for the vertical direction is beneficial for many applications, such as but not limited to computer monitors and TVs wherein a large vertical field-of-view is not required. Energy that otherwise would be wasted on a larger field-of-view in the vertical direction can be directed more normal to the display to increase on-axis brightness.

As described above, however, the periodicity of the reversed prismatic sheet 12 and the pixels in the LCD panel 10 interfere, potentially producing a Moiré fringe pattern. As depicted in FIG. 6, a top diffuser 211 is therefore disposed between the prismatic sheet 12 and the spatial light modulator 10 to reduce or eliminate the Moiré effect. Compared to the top diffuser 11 used in the previous configurations such as that shown in FIG. 5, the haze of the top diffuser 211 should be higher since less light 14 is recycled and therefore the coherence is relatively high. The top diffuser 211 typically has a haze value of between about 40-80. If the top diffuser 211 used with a reversed prismatic sheet 12 diffuses the light in a circular cone, the on-axis brightness will be reduced by unnecessary angular broadening in the direction orthogonal to the length of the elongated microprisms 13. Such is the case, for example, if the angular distribution of the top diffuser 211 is circularly symmetric and comprises a full width at half maximum (FWHM) of around 10°. This width can be comparable with the FWHM of the output light distribution in the vertical, y, direction, transmitted through the reverse prismatic sheet 12. The result is an undesired broadening in the angular distribution of light in the vertical direction and a corresponding reduction in the on-axis, x-direction, brightness. Thus, the circular top diffusers 211 when used with a reversed prismatic sheet 12 may result in a reduction in on-axis brightness from the undesired viewing volume broadening. Both the circular symmetry of the diffuser output distribution and the relatively high haze value of the top diffuser 211 contribute to this unnecessary angular broadening.

Figure 9:
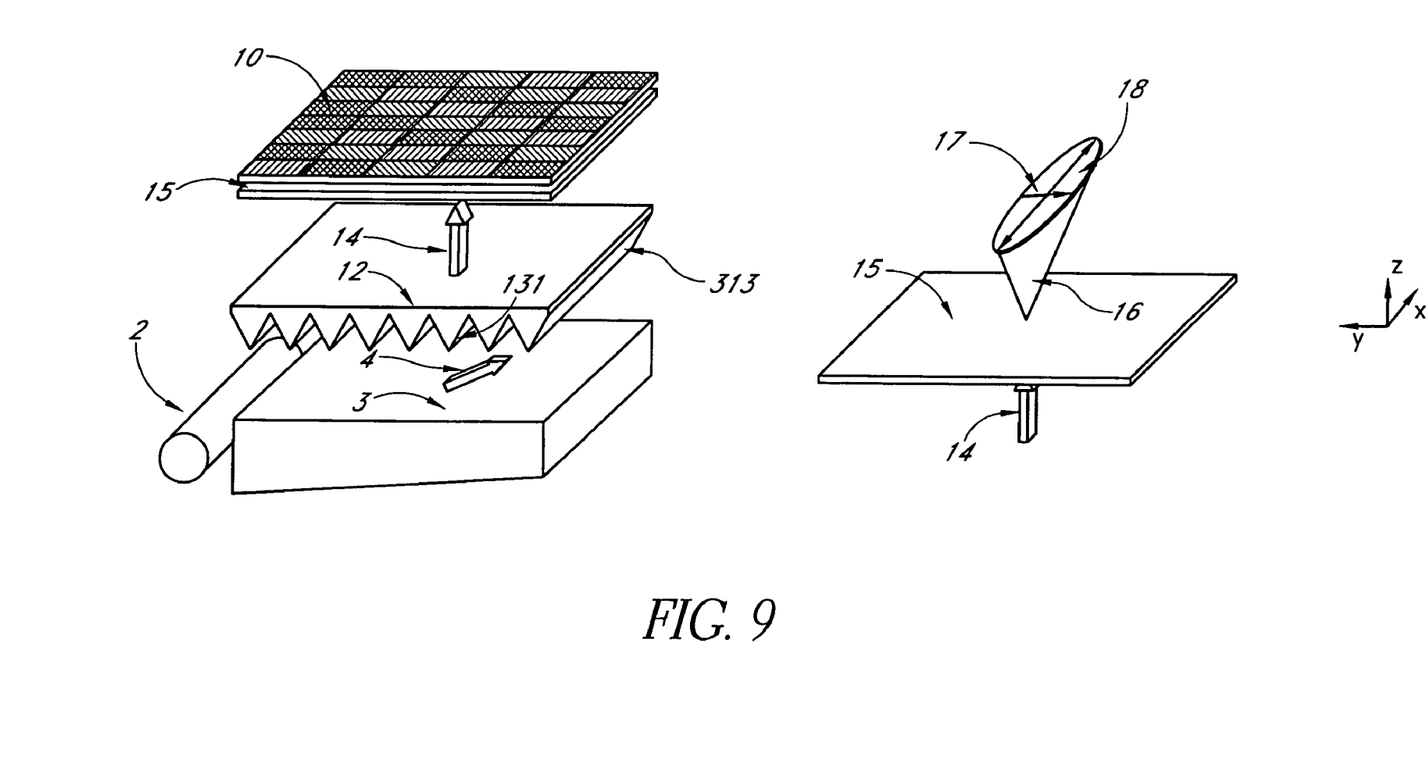
FIG. 9 depicts a configuration of a display comprising a light guide panel, a single reversed prismatic film, an elliptical diffuser, and a spatial light modulator such as an LCD array.

In certain embodiments, an asymmetric diffuser that diffuses light, e.g. collimated light, in one direction more than in another, e.g., orthogonal, direction, is used to increase on-axis brightness. As depicted in FIG. 9, for example, an embodiment of the backlit assembly employs a top diffuser 15 with an asymmetric distribution configured to spread incident light 14 more in a first direction than in a second direction. In the embodiment shown, light 4 emitted from the light guide panel 3 is transmitted through an optical film 12 comprising a plurality of anamorphic optical elements, such as for example microstructures or microprisms. These anamorphic optical elements are configured to redirect the output light 14 more normal to the spatial light modulator 10. As described above, for example, total internal reflection from the inclined facets of a plurality of microprisms is used to redirect the light toward the spatial light modulator. The plurality of anamorphic optical element redirect light directed in one direction more than light directed in a different, e.g., orthogonal, direction. Accordingly, the plurality of anamorphic optical elements redirect the angular distribution of light from the light guide panel 3 in one direction more than in another direction.

For example, the plurality of anamorphic optical elements shown in FIG. 9 comprise a plurality of elongated microprisms each arranged lengthwise parallel to the x axis. These elongated microprisms will therefore direct light 4 propagating parallel to the y-z plane more normal toward the z axis. Accordingly, the plurality of anamorphic optical elements redirect the angular distribution of light from the light guide panel 3 more along a direction parallel to the y-z plane than the x-z plane.

In certain embodiments of the backlit displays, such as but not limited use for computer monitors and TVs, the optical film will be oriented such that the angular distribution of the light 14 is smaller along the vertical, y, direction and is greater in the horizontal, x, direction. Only a single optical film for redirecting the light 4 in the vertical direction may be adequate since the light 4 emitted from the light guide plate 3 is already quite narrow along the horizontal, x, axis.

As depicted in FIG. 9, the optical film comprises a reversed prismatic sheet 12, further comprising, on one side thereof, a planar surface and on a second, opposing side thereof, a prismatic surface 313. The prismatic surfaces 313 may comprise a plurality of elongate microprisms 131 having an apex angle of between about 50° to 75°. The reversed prismatic sheet 12 may be oriented such that the prismatic surface faces the output surface of the light guide plate 31. Light 4 from the light guide is therefore incident on the prismatic surface 13 of the reversed prismatic sheet 12 and emitted from the planar surface of the reversed prismatic sheet 12. The elongate microprisms 131 are aligned lengthwise parallel to each other along the x direction such that the angular distribution of redirected light 14 from the reversed prismatic sheet 12 is greater along y direction than along the x direction. For example, the output light 14 may have an angular distribution with a full width half maximum (FWHM) of between about 20° and 90° along the y direction and FWHM of between about 40° and 170° along the x direction. In certain embodiments, the reverse prismatic sheet 12 is oriented such that y direction is vertical and the x direction is horizontal, since only a narrow FWHM on the vertical direction is needed of most display applications and such reduced field-of-view advantageously increases on-axis brightness.

The output light 14 may then be transmitted through a spatial light modulator, such as an LCD panel 10, for displaying an image. However, in the absence of an intermediate layer, the periodic structure of the reversed prismatic sheet 12 and the pixel structure of LCD panel 10 would interfere producing a Moiré fringe pattern. As described above, this Moiré pattern may comprise a series of observable fringes, which destroy the uniformity of the backlight and deteriorate the quality of the display.

An asymmetric top diffuser 15 may be included to diffuse the output light 14 between the reversed prismatic sheet 12 and the LCD panel 10 to reduce or eliminate the Moiré effect. As discussed more fully below, the asymmetric top diffuser 15 spreads light more in one direction than in another direction. The asymmetric top diffuser 15, may, for example, comprise an elliptical diffuser that diffuses light in different amounts along orthogonal x and y axes. Ideally, the major axis of the top diffuser 15 parallels the longitudinal axis of the elongated microprisms 131 on the reversed prismatic sheet 12. The asymmetric top diffuser 15 may be tailored or selected according to the desired spread in the different directions.

The asymmetric diffuser 15 may comprise a separate sheet disposed between the reversed prismatic sheet 12 and the LCD panel 10. Alternatively, the asymmetric diffuser 15 may be laminated to or produced directly on the smooth side of the prismatic sheet 12. Other configurations are possible.

In certain embodiments, the diffuser comprises a holographic element, e.g., a holographic diffuser such as the Tailored Micro-Diffusers (TMD™) manufactured by Wavefront Technology, Inc., located in Paramount, Calif. The holographic element may be formed through holographic recording and replication techniques. Computer generated holograms may also be used. The holographic diffusers may be volume or surface relief type holograms. The holograms may comprise a surface relief or volume micro-structure pattern comprising a plurality of random microstructures or pseudorandom microstructures. These mircrostructures may be elongated and in some embodiments may be elliptical. The randomness and structure dimensions of the microstructures may determine the diffusing output, which may be elliptical. In alternative embodiments, the randomness and structure dimensions of the microstructure pattern may be altered to create any number of elliptical or otherwise asymmetrical diffusing outputs.

In certain embodiments, the asymmetric diffuser 15 may comprise thin polymer film substrate having a plurality of microstructures disposed on a surface or in a volume thereof. In certain embodiments the diffuser is formed using a coating or layer of needle-like particles. Alternatively, in the coating technique, an orientation order can be formed through a shear effect during coating application and random surface relief structures with different dimensions can also be formed. Other types of diffusers both those well known in the art and those yet to be devised may be employed. Similarly, other techniques for forming such diffusers, both those well know in the art as well as those yet to be devised may be used.

Figure 8:
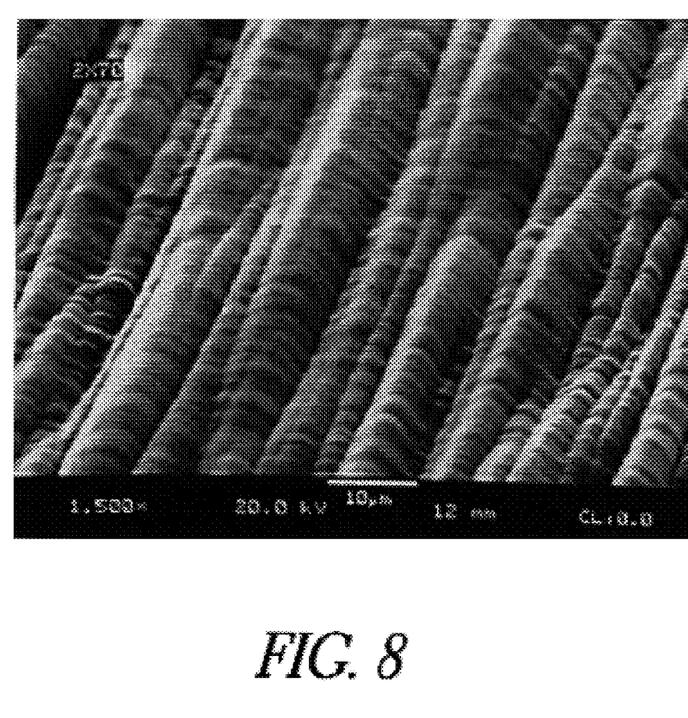
FIG. 8 depicts an example of the topography of an elliptical diffuser.

As depicted in FIG. 9, the asymmetric top diffuser 15 disposed between the reversed prismatic sheet 12 and the LCD panel 10 may comprise an elliptical diffuser 15, such as the diffuser shown in FIG. 8, having a major 18 and a minor 17 axis of light distribution. However, in alternative embodiments, any suitable asymmetric top diffuser configured to spread incident light more along a first direction than a second direction may be applied. The top diffuser 15 may be oriented such that a smooth side faces toward the LCD display 10 while a rough side, comprising the micro-structured surface, faces toward the reversed prismatic film 12. Other configurations are also possible.

When the light 14 from the reversed prismatic film 12 is incident upon the micro-structured surface of the diffuser 15, the diffusing effect of the top diffuser 15 reduces and/or eliminates the Moiré effect by smearing the periodic information in the light 14 from the reversed prismatic film. The diffuser 15 receives the light 14 output (which may be relatively collimated) from the linear reverse prismatic sheet 12 and mixes the light from various locations and substantially reduces or eliminates the coherence and the resulting Moiré pattern. The mixing power required to eliminate the Moiré is determined by the diffusing capability of the diffuser 15 and the distance between the diffuser 15 to the second periodic structure, here the LCD panel 10. In LCD backlight displays, this distance may be restricted and a high diffusing value may therefore be used to eliminate the Moiré effect. This high diffusing value creates an expanded angular distribution of the light output from the diffuser 15, which undesirably reduces the on-axis brightness of the display.

However, by using an asymmetric diffuser configured to spread incident light more along a first direction than a second direction and orienting the diffuser such that the first direction is substantially parallel to the longitudinal axes of the elongated microprisms in the reversed prismatic sheet 12, the efficiency of the backlight assembly can be substantially increased, for example, by 10% over conventional backlight displays. Similarly, aligning the second direction of the asymmetric diffuser orthogonal to the length of the elongated microstructures results in the angular distribution along the second direction being more restricted, thereby reducing or minimizing wasted light and increasing or maximizing the light within the desired viewing range of viewing angles.

As shown in FIG. 9, the elliptical diffuser 15 may diffuse the light 14 into an elliptical cone 16 which has a beam cross-section with a major 17 and minor 18 axes when illuminated by a collimated circular beam. In certain embodiments, the elliptical diffuser 15 may be configured such that the elliptical diffuser converts a collimated circular beam into an elliptical beam having an angular distribution having a full width at half maximum (FWHM) of between about 2° and 15° along the minor axis 17 and a FWHM of between about 4° and 30° along the major axis 18. The elliptical diffuser 15 may be oriented such that the major axis 18 of the cone 16 is parallel to the horizontal, x, direction, i.e., the major axis of the light distribution after the prismatic sheet 12, while the minor axis 17 of the cone 16 is parallel to the vertical, y, direction, i.e., the minor axis of the light distribution after the reversed sheet 12. By aligning the major 18 and minor 16 axes of the elliptical diffuser with the major, x, and minor, y, axes of light distribution from the prismatic sheet 12, the Moiré effect may be eliminated without significant additional broadening of the light distribution along the minor axis 16 and thus without an undesirable reduction in on axis brightness.

A variety of modifications are possible. For example, different types of light sources, light guide plates, anamophic elements, diffusers, and spatial light modulators may be used. The configuration and arrangement may be altered. Still other variations are possible. For example, other components may be added, or components may be removed, reordered or rearranged. Similarly, additional processing or method steps may be included, processing or method steps may be removed, and the order may vary.

Although the foregoing description of the preferred embodiments of the present invention has shown, described and pointed out the fundamental novel features of the invention, it will be understood that various omissions, substitutions, and changes in the form of the detail of the apparatus as illustrated as well as the uses thereof, may be made by those skilled in the art, without departing from the spirit of the invention.

What is claimed is:

1. A display apparatus comprising:
   a light guide comprising substantially optically transmissive material that can propagate light therein, said light guide further comprising an output face for output of said light, said light output from said output face having an angular distribution;

a plurality of anamorphic optical elements disposed forward of said front output face such that light from said output face of said light guide is incident on said anamorphic optical elements, said anamorphic optical elements redirecting said angular distribution along a first direction, y, more than in a second direction, x;

a spatial light modulator forward said plurality of anamorphic optical elements to receive said light from said output face of said light guide;

an asymmetric diffuser disposed between said anamorphic optical elements and said spatial light modulator, said asymmetric diffuser configured to spread light incident thereon more along said second direction, x, than said first direction, y, wherein said plurality of anamorphic optical elements are configured such that said light received by said asymmetric diffuser has an angular distribution having a full width half maximum smaller along the first direction, y, of between about 20° and 90° and a full width half maximum along the second direction, x, of between about 40° and 170°; and an optical layer, wherein said plurality of anamorphic optical elements are disposed on a rear surface of said optical layer, said rear surface facing said light guide.

2. The display apparatus of claim 1, further comprising a light source disposed with respect to the light guide to direct light from said light source into said optically transmissive material.

3. The display apparatus of claim 2, wherein said light source comprises a linear light source and said light guide is edge-lit by said linear light source.

4. The display apparatus of claim 2, wherein said light source comprises a fluorescent tube.

5. The display apparatus of claim 2, wherein said light source comprises one or more light emitting diodes.

6. The display apparatus of claim 1, wherein said light guide comprises a plate.

7. The display apparatus of claim 1, wherein said light guide comprises a wedge.

8. The display apparatus of claim 1, wherein said optically transmissive material comprises glass or plastic.

9. The display apparatus of claim 1, further comprising extractors that scatter light guided within said light guide such that said light exits said output face of said light guide.

10. The display apparatus of claim 1, wherein said optical layer comprises a polymeric sheet.

11. The display apparatus of claim 1, wherein said plurality of anamorphic optical elements comprise a plurality of elongate microprisms each comprising facets angled with respect to each other, said plurality of elongate microprisms disposed on a prismatic layer.

12. The display apparatus of claim 11, wherein said facets are oriented with respect to each other at an angle of between about 50° and 75°.

13. The display apparatus of claim 11, wherein said facets are oriented with respect to each other at an angle of between about 85° and 95°.

14. The display apparatus of claim 11, wherein said elongate microprisms are lengthwise parallel to each other and to said second direction, x.

15. The display apparatus of claim 1, wherein said first direction, y, is substantially orthogonal to said second direction, x.

16. The display apparatus of claim 1, wherein said spatial light modulator comprises a liquid crystal display.

17. The display apparatus of claim 1, wherein said asymmetric diffuser comprises a holographic elliptical diffuser.

18. The display apparatus of claim 1, wherein said asymmetric diffuser is configured to produce a substantially elliptical beam having a beam cross-section having a major and a minor axis when illuminated with a collimated circular beam, said minor axis being aligned with the first direction, y, and the major axis being aligned with said second direction, x.

19. The display of claim 1, wherein the optical layer further comprises said asymmetric diffuser.

20. A display apparatus comprising:
a light guide comprising substantially optically transmissive material that can propagate light therein, said light guide further comprising an output face for output of said light, said light output from said output face having an angular distribution;

a plurality of anamorphic optical elements disposed forward of said front output face such that light from said output face of said light guide is incident on said anamorphic optical elements, said anamorphic optical elements redirecting said angular distribution along a first direction, y, more than in a second direction, x;

a spatial light modulator forward said plurality of anamorphic optical elements to receive said light from said output face of said light guide; and an asymmetric diffuser disposed between said anamorphic optical elements and said spatial light modulator, said asymmetric diffuser configured to spread light incident thereon more along said second direction, x, than said first direction, y, wherein said asymmetric diffuser is configured to produce a substantially elliptical beam having a beam cross-section having a major and a minor axis when illuminated with a collimated circular beam, said minor axis being aligned with the first direction, y, said major axis being aligned with the second direction, x, and said asymmetric diffuser is configured such that said substantially elliptical beam produced by a collimated circular beam has an angular distribution having a full width half maximum along the first direction, y, of between about 2° and 15° and a full width half maximum along the second direction, x, of between about 4° and 30°, wherein said plurality of anamorphic optical elements comprise a plurality of elongate microprisms each comprising facets angled with respect to each other, said plurality of elongate microprisms disposed on a prismatic layer, wherein said facets are disposed on a rear surface of a prismatic layer, said rear surface facing said light guide.

21. The display apparatus of claim 20, wherein said light guide comprises a plate.

22. The display apparatus of claim 20, wherein said elongate microprisms are lengthwise parallel to each other and to said second direction, x.

23. The display apparatus of claim 20, wherein the plurality of anamorphic optical elements redirect the light output from the light guide through total internal reflection.

24. The display apparatus of claim 20, wherein said plurality of anamorphic optical elements are configured such that said light received by said asymmetric diffuser has an angular distribution having a full width half maximum along the first direction, y, of between about 20° and 90° and a full width half maximum along the second direction, x, of between about 40° and 170°.

25. The display of claim 20, wherein the prismatic layer further comprises said asymmetric diffuser.

26. A display apparatus comprising:
a light guide comprising substantially optically transmissive material that can propagate light therein, said light guide further comprising an output face for output of said light, said light output from said output face having an angular distribution;
a plurality of anamorphic optical elements disposed forward of said front output face such that light from said output face of said light guide is incident on said anamorphic optical elements, said anamorphic optical elements redirecting said angular distribution along a first direction, y, more than in a second direction, x;
a spatial light modulator forward said plurality of anamorphic optical elements to receive said light from said output face of said light guide; and
an asymmetric diffuser disposed between said anamorphic optical elements and said spatial light modulator, said asymmetric diffuser configured to spread light incident thereon more along said second direction, x, than said first direction, y, wherein said plurality of anamorphic optical elements are configured such that said light received by said asymmetric diffuser has an angular distribution having a full width half maximum smaller along the first direction, y, of between about 20° and 90° and a full width half maximum along the second direction, x, of between about 40° and 170°,
wherein said plurality of anamorphic optical elements comprise a plurality of elongate microprisms each comprising facets angled with respect to each other, said plurality of elongate microprisms disposed on a prismatic layer,
wherein said facets are disposed on a rear surface of a prismatic layer, said rear surface facing said light guide.

27. The display of claim 26, wherein the prismatic layer further comprises said asymmetric diffuser.

28. A display apparatus comprising:
a light guide comprising substantially optically transmissive material that can propagate light therein, said light guide further comprising an output face for output of said light, said light output from said output face having an angular distribution;
a plurality of anamorphic optical elements disposed forward of said front output face such that light from said output face of said light guide is incident on said anamorphic optical elements, said anamorphic optical elements redirecting said angular distribution along a first direction, y, more than in a second direction, x;
a spatial light modulator forward said plurality of anamorphic optical elements to receive said light from said output face of said light guide; and
an asymmetric diffuser disposed between said anamorphic optical elements and said spatial light modulator, said asymmetric diffuser configured to spread light incident thereon more along said second direction, x, than said first direction, y, wherein said plurality of anamorphic optical elements are configured such that said light received by said asymmetric diffuser has an angular distribution having a full width half maximum smaller along the first direction, y, of between about 20° and 90° and a full width half maximum along the second direction, x, of between about 40° and 170°,
wherein said plurality of anamorphic optical elements comprise a plurality of elongate microprisms each comprising facets angled with respect to each other, said plurality of elongate microprisms disposed on a prismatic layer,
wherein only one prismatic layer is disposed between said light guide and said spatial light modulator.

29. The display of claim 28, wherein said one prismatic layer further comprises said asymmetric diffuser.

30. A display apparatus comprising:
a light guide comprising substantially optically transmissive material that can propagate light therein, said light guide further comprising an output face for output of said light, said light output from said output face having an angular distribution;
a plurality of anamorphic optical elements disposed forward of said front output face such that light from said output face of said light guide is incident on said anamorphic optical elements, said anamorphic optical elements redirecting said angular distribution along a first direction, y, more than in a second direction, x;
a spatial light modulator forward said plurality of anamorphic optical elements to receive said light from said output face of said light guide; and
an asymmetric diffuser disposed between said anamorphic optical elements and said spatial light modulator, said asymmetric diffuser configured to spread light incident thereon more along said second direction, x, than said first direction, y, wherein said asymmetric diffuser is configured to produce a substantially elliptical beam having a beam cross-section having a major and a minor axis when illuminated with a collimated circular beam, said minor axis being aligned with the first direction, y, said major axis being aligned with the second direction, x, and said asymmetric diffuser is configured such that said substantially elliptical beam produced by a collimated circular beam has an angular distribution having a full width half maximum along the first direction, y, of between about 2° and 15° and a full width half maximum along the second direction, x, of between about 4° and 30°,
wherein said plurality of anamorphic optical elements comprise a plurality of elongate microprisms each comprising facets angled with respect to each other, said plurality of elongate microprisms disposed on a prismatic layer,
wherein only one prismatic layer is disposed between said light guide and said spatial light modulator.

31. The display of claim 30, wherein said one prismatic layer further comprises said asymmetric diffuser.

32. A display apparatus comprising:
a light guide comprising substantially optically transmissive material that can propagate light therein, said light guide further comprising an output face for output of said light, said light output from said output face having an angular distribution;
a plurality of anamorphic optical elements disposed forward of said front output face such that light from said output face of said light guide is incident on said anamorphic optical elements, said anamorphic optical elements redirecting said angular distribution along a first direction. y, more than in a second direction, x;
a spatial light modulator forward said plurality of anamorphic optical elements to receive said light from said output face of said light guide; and
an asymmetric diffuser disposed between said anamorphic optical elements and said spatial light modulator, said asymmetric diffuser configured to spread light incident thereon more along said second direction, x, than said first direction, y, wherein said asymmetric diffuser is configured to produce a substantially elliptical beam having a beam cross-section having a major and a minor axis when illuminated with a collimated circular beam, said minor axis being aligned with the first direction, y, said major axis being aligned with the second direction, x, and said asymmetric diffuser is configured such that said substantially elliptical beam produced by a collimated circular beam has an angular distribution having a full width half maximum along the first direction, y, of between about 2° and 15° and a full width half maximum along the second direction, x, of between about 4° and 30°, wherein said plurality of anamorphic optical elements comprise a plurality of elongate microprisms each comprising facets angled with respect to each other, said plurality of elongate microprisms disposed on a prismatic layer, wherein all prismatic layers disposed between said light guide and said spatial light modulator redirect said angular distribution along the first direction, y, more than in the second direction, x.

33. The display of claim 32, wherein said prismatic layer further comprises said asymmetric diffuser.

34. A display apparatus comprising:
a light guide comprising substantially optically transmissive material that can propagate light therein, said light guide further comprising an output face for output of said light, said light output from said output face having an angular distribution;
a plurality of anamorphic optical elements disposed forward of said front output face such that light from said output face of said light guide is incident on said anamorphic optical elements, said anamorphic optical elements redirecting said angular distribution along a first direction, y, more than in a second direction, x;
a spatial light modulator forward said plurality of anamorphic optical elements to receive said light from said output face of said light guide; and
an asymmetric diffuser disposed between said anamorphic optical elements and said spatial light modulator, said asymmetric diffuser configured to spread light incident thereon more along said second direction, x, than said first direction, y, wherein said asymmetric diffuser is configured to produce a substantially elliptical beam having a beam cross-section having a major and a minor axis when illuminated with a collimated circular beam, said minor axis being aligned with the first direction, y, said major axis being aligned with the second direction, x, and said asymmetric diffuser is configured such that said substantially elliptical beam produced by a collimated circular beam has an angular distribution having a full width half maximum along the first direction, y, of between about 2° and 15° and a full width half maximum along the second direction, x, of between about 4° and 30°,
wherein all anamorphic optical elements disposed between said light guide and said spatial light modulator redirect said angular distribution along the first direction, y, more than in the second direction, x.

35. A display apparatus comprising:
a light guide comprising substantially optically transmissive material that can propagate light therein, said light guide further comprising an output face for output of said light, said light output from said output face having an angular distribution;
a plurality of anamorphic optical elements disposed forward of said front output face such that light from said output face of said light guide is incident on said anamorphic optical elements, said anamorphic optical elements redirecting said angular distribution along a first direction, y, more than in a second direction, x;
a spatial light modulator forward said plurality of anamorphic optical elements to receive said light from said output face of said light guide; and
an asymmetric diffuser disposed between said anamorphic optical elements and said spatial light modulator, said asymmetric diffuser configured to spread light incident thereon more along said second direction, x, than said first direction, y, wherein said asymmetric diffuser is configured to produce a substantially elliptical beam having a beam cross-section having a major and a minor axis when illuminated with a collimated circular beam, said minor axis being aligned with the first direction, y, said major axis being aligned with the second direction, x, and said asymmetric diffuser is configured such that said substantially elliptical beam produced by a collimated circular beam has an angular distribution having a full width half maximum along the first direction, y, of between about 2° and 15° and a full width half maximum along the second direction, x, of between about 4° and 30°,
wherein the plurality of anamorphic optical elements is implemented using a single reversed prismatic sheet with a planar surface proximal to the asymmetric diffuser and a prismatic surface proximal to the light guide.

36. The display apparatus of claim 35, wherein the prismatic surface comprises a plurality of elongated microprisms each having a pair of inclined surfaces that come together to form an apex with an apex angle of between about 50°-75°.

37. A display apparatus comprising:
a light guide comprising substantially optically transmissive material that can propagate light therein, said light guide further comprising an output face for output of said light, said light output from said output face having an angular distribution;
a plurality of anamorphic optical elements disposed forward of said front output face such that light from said output face of said light guide is incident on said anamorphic optical elements, said anamorphic optical elements redirecting said angular distribution along a first direction, y, more than in a second direction, x;
a spatial light modulator forward said plurality of anamorphic optical elements to receive said light from said output face of said light guide; and
an asymmetric diffuser disposed between said anamorphic optical elements and said spatial light modulator, said asymmetric diffuser configured to spread light incident thereon more along said second direction, x, than said first direction, y, wherein said asymmetric diffuser is configured to produce a substantially elliptical beam having a beam cross-section having a major and a minor axis when illuminated with a collimated circular beam, said minor axis being aligned with the first direction, y, said major axis being aligned with the second direction, x, and said asymmetric diffuser is configured such that said substantially elliptical beam produced by a collimated circular beam has an angular distribution having a full width half maximum along the first direction, y, of between about 2° and 15° and a full width half maximum along the second direction, x, of between about 4° and 30°,
wherein the plurality of anamorphic optical elements comprise elongated microprisms and all of the elongated microprisms between the light guide and the spatial light modulator are oriented along one direction.

* * * * *

UNITED STATES PATENT AND TRADEMARK OFFICE
CERTIFICATE OF CORRECTION

| | |
|---|---|
| PATENT NO. | : 7,430,358 B2 |
| APPLICATION NO. | : 11/406792 |
| DATED | : September 30, 2008 |
| INVENTOR(S) | : Jun Qi, Joel Mikael Petersen and Christopher Chapman Rich |

It is certified that error appears in the above-identified patent and that said Letters Patent is hereby corrected as shown below:

In Column 2 at line 35, change "y" to --y.--.

In Column 9 at line 29, change "mircrostructures" to --microstructures--.

In Column 10 at line 48, change "anamophic" to --anamorphic--.

In Column 14 at line 57, in Claim 32, change "direction." to --direction,--.

Signed and Sealed this

Seventh Day of April, 2009

JOHN DOLL
*Acting Director of the United States Patent and Trademark Office*